United States Patent
Kudo

(10) Patent No.: US 11,407,862 B2
(45) Date of Patent: Aug. 9, 2022

(54) SILICONE AND A METHOD FOR PREPARING THE SAME

(71) Applicant: SHIN-ETSU CHEMICAL CO., LTD., Tokyo (JP)

(72) Inventor: Muneo Kudo, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 182 days.

(21) Appl. No.: 16/971,366

(22) PCT Filed: Feb. 15, 2019

(86) PCT No.: PCT/JP2019/005550
§ 371 (c)(1),
(2) Date: Aug. 20, 2020

(87) PCT Pub. No.: WO2019/163668
PCT Pub. Date: Aug. 29, 2019

(65) Prior Publication Data
US 2020/0385530 A1 Dec. 10, 2020

(30) Foreign Application Priority Data
Feb. 22, 2018 (JP) .............................. JP2018-029441

(51) Int. Cl.
*C08G 77/38* (2006.01)
*C08G 77/20* (2006.01)

(52) U.S. Cl.
CPC ............ *C08G 77/20* (2013.01); *C08G 77/38* (2013.01)

(58) Field of Classification Search
CPC ......... C08G 77/20; C08G 77/12; C08G 77/38
See application file for complete search history.

(56) References Cited

U.S. PATENT DOCUMENTS

| 4,260,725 | A | 4/1981 | Keogh et al. |
| 2010/0113731 | A1 | 5/2010 | Hayashi et al. |
| 2016/0311981 | A1* | 10/2016 | Kudo ..................... C08G 77/20 |

FOREIGN PATENT DOCUMENTS

| JP | 56-94323 A | 7/1981 |
| JP | 62-29776 B2 | 6/1987 |
| JP | 2008-274241 A | 11/2008 |
| JP | 2009-280652 A | 12/2009 |
| JP | 2010-222498 A | 10/2010 |
| JP | 2016-204534 A | 12/2016 |
| WO | WO 2017/189703 A1 | 11/2017 |
| WO | WO 2017/189704 A1 | 11/2017 |

OTHER PUBLICATIONS

International Search Report, issued in PCT/JP2019/005550, dated Mar. 12, 2019.
Written Opinion of the International Searching Authority, issued in PCT/JP2019/005550, dated Mar. 12, 2019.

* cited by examiner

*Primary Examiner* — Kuo Liang Peng
(74) *Attorney, Agent, or Firm* — Birch, Stewart, Kolasch & Birch, LLP

(57) ABSTRACT

One of the purposes of the present invention is to provide a silicone which has polymerizable groups at the both terminals and a hydrophilic side chain having three or four hydroxyl groups, is colorless and transparent and is well compatible with another monomer, particularly with hydrophilic monomer, and a method for preparing the same. The present inventor has made research to solve the aforementioned problems and found that a silicone represented by the formula (1), which has an unbranched or branched alkyl group represented by —$C_pH_{2p+1-q}$(OH) and a hydrophilic side chain containing an ether bond, has no coloration and is well compatible with other hydrophilic monomers. Therefore, the silicone polymerizes with a monomer having high hydrophilicity to give a colorless, transparent and highly hydrophilic copolymer. Further, the present inventors have found that the silicone represented by the formula (1) is obtained by addition reacting an organohydrogenpolysiloxane represented by the formula (4) with a compound represented by the formula (5).

9 Claims, No Drawings

SILICONE AND A METHOD FOR PREPARING THE SAME

FIELD OF THE INVENTION

The present invention relates to a silicone and a method for preparing the same, particularly a silicone which is useful as starting materials for preparing ophthalmic devices and a method for preparing the same. Specifically, the present invention relates to a silicone which has (meth)acryl groups at the both terminals and is copolymerizable with other polymerizable monomer for preparing ophthalmic devices to form a crosslinking structure to thereby provide a polymer having a flexibility and being suitable for an ophthalmic devices such as contact lenses e.g. hydrophilic contact lenses and silicone hydrogels, intraocular lenses and artificial corneas, and a method for preparing the silicone.

BACKGROUND OF THE INVENTION

Various polymerizable silicone monomers which are useful as starting materials for preparing ophthalmic devices having oxygen permeability and hydrophilicity, in particular starting materials for contact lenses, has been developed. Specifically, a polysiloxane having polymerizable groups at the both terminals and a hydrophilic side chain is developed as starting materials for contact lenses having high oxygen permeability.

For instance, Japanese Examined Patent Publication No. Sho62-29776 describes a hydrophilic contact lens prepared using a polysiloxane having polymerizable groups at the both terminals and a hydrophilic side chain as a monomer compound. The hydrophilic side chain is the groups represented by the following formula (a).

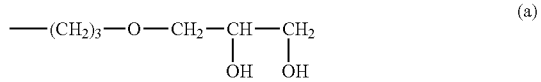
(a)

Japanese Patent Application Laid-Open No. 2016-204534 describes a silicone having polymerizable groups at both terminals and having a hydrophilic side chain, and describes a hydrophilic side chain represented by the following formula (b) or formula (c).

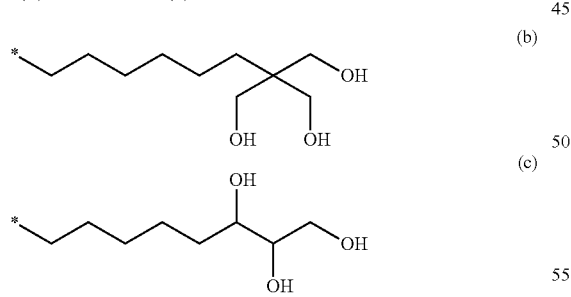

wherein the site indicated by "*" is a position of bonding to a silicon atom.

PRIOR LITERATURE

Patent Literature

Patent Literature 1: Japanese Examined Patent Publication No. Sho62-29776
Patent Literature 2: Japanese Patent Application Laid-Open No. 2016-204534

SUMMARY OF THE INVENTION

Problems to be Solved by the Invention

However, the hydrophilicity of the polysiloxane having the hydrophilic side chain, represented by the aforesaid formulas (a), (b) or (c), is insufficient. Therefore, when another monomer, particularly a hydrophilic monomer, is mixed in the aforesaid polysiloxane in a high blending amount for the purpose of imparting higher hydrophilicity to an ophthalmic device, turbidity occurs in the composition, and an ophthalmic device comprising the monomer also has turbidity.

The present invention is to provide a silicone which has a polymerizable group at the both terminals and a hydrophilic side chain, and is colorless and transparent and well compatible with another monomer, particularly with a hydrophilic monomer, and a method for preparing the silicone.

Means to Solve the Problems

The present inventor has made research to solve the afore-mentioned problems and found that a silicone represented by the following formula (1), having 3 or 4 hydroxyl groups and a hydrophilic side chain containing an ether bond is colorless and well compatible with other hydrophilic monomers. The silicone polymerizes with a monomer having high hydrophilicity to give a colorless, transparent and highly hydrophilic copolymer.

Further, the present inventors have found that the silicone represented by the following formula (1) is obtained by addition-reacting an organohydrogenpolysiloxane represented by the following formula (4) with a compound represented by the following formula (5).

Thus, the present invention provides a silicone represented by the following formula (1):

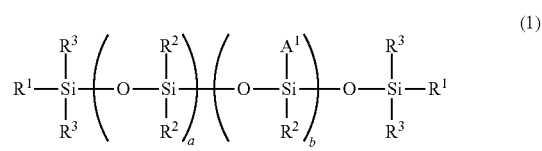
(1)

wherein $R^1$ is a group represented by the following formula (2);

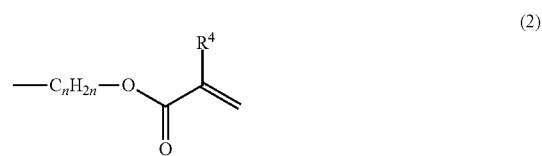
(2)

wherein n is an integer of from 2 to 8, and $R^4$ is a methyl group or a hydrogen atom, $R^2$ is, independently of each other, a substituted or unsubstituted monovalent hydrocarbon group having 1 to 10 carbon atoms, $R^3$ is, independently of each other, an alkyl group having 1 to 6 carbon atoms, $A^1$ is a group represented by the following formula (3):

(3)

wherein m is an integer of from 2 to 10, X is an unbranched or branched alkyl group having three or four hydroxyl groups, and represented by $-C_pH_{2p+1-q}(OH)_q$, wherein p is an integer of from 1 to 6 and q is 3 or 4, a is an integer of from 1 to 500, b is an integer of from 1 to 100 and a total of a and b is 50 to 600, and the siloxane units in the parentheses may be sequenced at random or form a block unit.

A method for preparing the silicone represented by the following formula (1) comprises a step of addition reacting an organohydrogenpolysiloxane represented by the following formula (4):

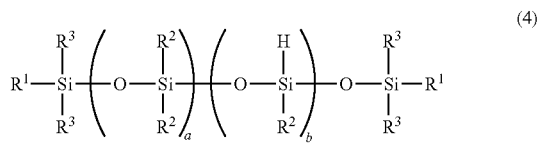

(4)

wherein $R^1$, $R^2$, $R^3$, a and b are as defined above, with a compound represented by the following formula (5):

(5)

wherein k=m−2, m and X are as defined above, to thereby obtain the silicone represented by the formula (1).

Effects of the Invention

The present silicone is colorless and transparent, and is well compatible with other monomers, particularly hydrophilic monomers. Therefore, the present silicone is useful for preparing ophthalmic devices, such as contact lenses, intraocular lenses, and artificial corneals.

DETAILED DESCRIPTION OF THE INVENTION

The present silicone is represented by the following formula (1), and has a polymerizable group represented by the following formula (2) at both terminals, and has a group represented by the following formula (3) as a hydrophilic side chain.

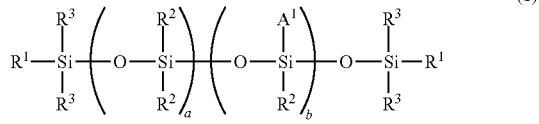

(1)

wherein $R^1$ is a group represented by the following formula (2):

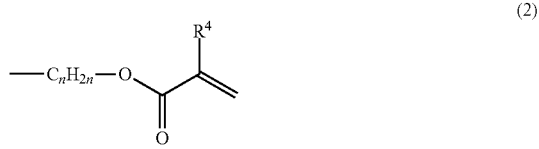

(2)

$R^2$ is, independently of each other, a substituted or unsubstituted monovalent hydrocarbon group having 1 to 10 carbon atoms, $R^3$ is, independently of each other, an alkyl group having 1 to 6 carbon atoms, $A^1$ is a group represented by the following formula (3).

(3)

The group represented by the aforementioned formula (3) is a hydrophilic side chain characterized in that it is a hydrocarbon chain having 3 or 4 hydroxyl groups and it has an ether bond. On account of the hydrophilic side chain, the present silicone has higher hydrophilicity and is better compatible with other hydrophilic monomers. If the number of a hydroxyl group in the hydrophilic side chain is less than 3 or the side chain has no ether bond, hydrophilicity becomes insufficient. Therefore, when the silicone is mixed with another hydrophilic monomer, turbidity occurs and a colorless and transparent polymer cannot be obtained.

In the aforesaid formula (3), m is an integer of from 2 to 10, preferably an integer of from 3 to 6. X is an unbranched or branched alkyl group having three or four hydroxyl groups, and represented by $-C_pH_{2p+1-q}(OH)_q$. p is an integer of from 1 to 6, preferably 3 to 6, more preferably 4 or 5, and q is 3 or 4.

In the formula (3), X is bonded to the group, $-C_mH_{2m}-$ via an oxygen atom to form an ether bond. X has a structure in which three or four of hydrogen atoms of an alkyl group are each substituted with a hydroxyl group. Examples of the alkyl groups include a methyl group, an ethyl group, a propyl group, an isopropyl group, a butyl group, a tert-butyl group, an isobutyl group, a sec-butyl group, a methylbutyl group, a dimethylbutyl group, a pentyl group, a methylpentyl group and a hexyl group, preferably a butyl group or a pentyl group. Plural hydroxyl groups may bond to one carbon atom, but one carbon atom preferably has one hydroxyl group.

X in the aforesaid formula (3) is preferably a group represented by the following formula (6) or (7). These groups give higher hydrophilicity to the silicone.

(6)

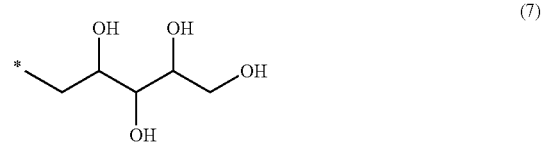

(7)

wherein the site indicated by "*" is a position of bonding to the oxygen atom.

In the aforesaid formula (2), n is an integer of from 2 to 8, preferably 3 or 4, and $R^4$ is a methyl group or a hydrogen atom.

In the aforesaid formula (1), $R^2$ is, independently of each other, a substituted or unsubstituted, monovalent hydrocarbon group having 1 to 10 carbon atoms, preferably 1 to 6 carbon atoms. Examples of the monovalent hydrocarbon group include an alkyl group such a methyl group, an ethyl group, a propyl group, a butyl group, a pentyl group and a hexyl group; cycloalkyl group such as a cyclohexyl group; an aryl group such as a phenyl group, a tolyl group and a naphthyl group; an aralkyl group such as a benzyl group, a phenylethyl group and a phenylpropyl group; and an alkenyl group such as a vinyl group and an allyl group; and those hydrocarbon groups wherein a part or all of the hydrogen atoms bonded to the carbon atoms are substituted with a substituent such as a halogen atom such as a fluorine atom and a chlorine atom, e.g., halogen-substituted monovalent hydrocarbon groups such as trifluoropropyl group. Among these, a methyl group is preferred.

In the aforesaid formula (1), $R^3$ is, independently of each other, an alkyl group having 1 to 6 carbon atoms, preferably 1 to 4 carbon atoms, such as a methyl group, an ethyl group, a propyl group, a butyl group, a pentyl group and a hexyl group. Among these, a methyl group is preferred.

In the formula (1), a is an integer of from 1 to 500, preferably 50 to 300, b is an integer of from 1 to 100, preferably 4 to 40, provided that a total of a and b is 50 to 600, preferably 80 to 340, particularly 100 to 300. If the total of a and b is less than the aforesaid lower limit, it is difficult to provide a polymer having proper flexibility. If the total of a and b is more than the aforesaid upper limit, the silicone is poor compatible with other hydrophilic monomer. In particular, it is preferred in view of a valance of the hydrophilicity and a hydrophobicity of a siloxane that the each number of a and b is in the aforesaid range and the ratio of a to b is 10 to 50. In the formula (1), the siloxane units in the parentheses may be sequenced at random or form a block unit.

The silicone represented by the formula (1) is obtained by an addition reaction of an organohydrogenpolysiloxane represented by the following formula (4):

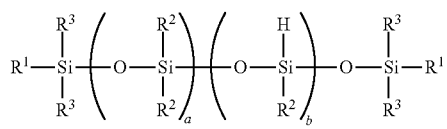

wherein $R^1$, $R^2$, $R^3$, a and b are as defined above, with a compound represented by the following formula (5):

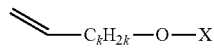

wherein k=m−2, m and X are as defined above. In the formula (4), the bonding order of each siloxane unit in the parentheses is not limited, and may be at random.
The present method will be described below in more detail.

In the formula (5), k=m−2. m is as defined above. That is, k is an integer of from 0 to 8, preferably an integer of from 1 to 4. X is as described for the formula (3) above, and more preferably is a group represented by the following formula (6) or (7).

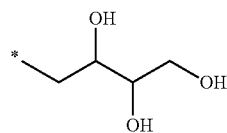

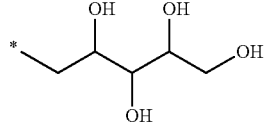

wherein the site indicated by "*" is a position of bonding to the oxygen atom.

Examples of the compound represented by the formula (5) include compounds represented by the following formula (8) or (9).

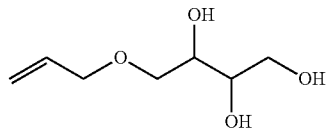

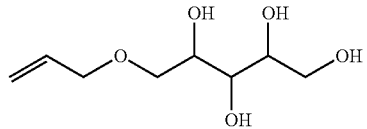

The organohydrogenpolysiloxane represented by the formula (4) is prepared in the known manners. In particular, (meth)acrylic silicone dimer is used as a starting material for making a terminal. The (meth)acrylic silicone dimer is, for instance, represented by the following formula:

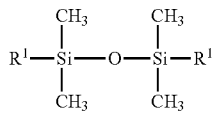

wherein $R^1$ is as defined above.

Examples of the (meth)acrylic silicone dimer include a compound represented by the following formula (10).

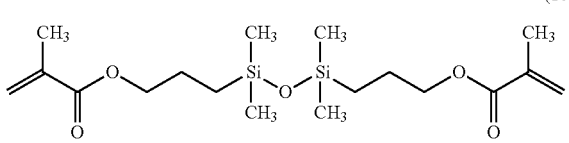

For instance, the compound represented by the formula (10), 1,1,3,3,5,5,7,7-octamethyltetrasiloxane and 1,3,5,7-tetramethyltetrasiloxane are mixed in a proper amount and subjected to a equilibration reaction in the presence of a trifluoromethanesulfonic acid catalyst. Subsequently, the reaction mixture is neutralized and generated components having a low boiling temperature are stripped off at a reduced pressure to obtain an organohydrogenpolysiloxane represented by the following formula (11).

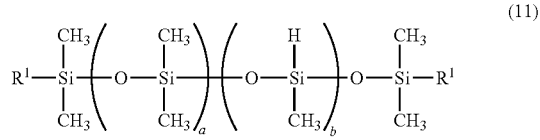

(11)

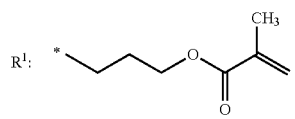

wherein the site indicated by "*" is a position of bonding to the silicon atom and a and b are as defined above.

The addition reaction of the organohydrogenpolysiloxane represented by the formula (4) with the compound represented by the formula (5) may be carried out in any conventional manner. For instance, the reaction is carried out in the presence of a hydrosilylation catalyst such as platinum group metal compounds. A solvent may be used. Examples of the solvent include aliphatic or aromatic solvents such as hexane, methylcyclohexane, ethylcyclohexane and toluene; and alcoholic solvents such as ethanol and IPA.

It is preferred that the compound represented by the formula (5) is optionally diluted with a solvent to which, then, a hydrosilylation catalyst of platinum family is added. The amount of the compound represented by the formula (5) is preferably such that a ratio of the number of unsaturated group in the compound represented by the formula (5) to the number of SiH group in the organohydrogenpolysiloxane represented by the formula (4) is 1 to 2. The type of the hydrosilylation platinum catalyst is not particularly limited, and conventionally known ones may be used. The amount of platinum is preferably 2 to 30 ppm, based on the total mass of the reaction substrates and the solvent.

Subsequently, the organohydrogenpolysiloxane represented by the formula (4) is added dropwise to the mixture to react at room temperature or a higher temperature. After the completion of the addition, the reaction mixture is held under heating. An amount of remaining SiH group in the reaction liquid is determined in a known manner to confirm the end point of the reaction. For instance, a determination of an amount of a hydrogen gas generated is conducted to determine an amount of remaining SiH group. After the end point of the reaction is confirmed, the solvent is removed from the reaction liquid. The unreacted organohydrogenpolysiloxane does not remain in a product, so that a silicone obtained has one specific structure at a higher ratio. The aforesaid addition reaction may be conducted in one step.

After the completion of the addition reaction, an excessive compound (5) is removed from the reaction liquid. For instance, the reaction liquid is subjected to stripping under a reduced pressure, or washed with ion exchanged water or an aqueous sodium sulfate solution to extract the compound (5) into an aqueous phase. Here, a proper amount of solvent, such as toluene, hexane and acetone may preferably be used to attain clear phase separation. Further, it is preferable that the silicone or silicone solution is treated with an adsorbent such as the activated carbon or a silica gel for purification, or treated with a filter such as a filter paper or a filter plate for improving appearance. The product obtained by the addition reaction of the formulas (4) with (5) may be colored and, then, may be purified with an adsorbent and/or a filter to obtain a colorless one.

In the aforesaid reaction, a polymerization inhibitor may be added, if needed. Any conventional polymerization inhibitor for a (meth)acryl compound may be used, such as, for instance, a phenol type polymerization inhibitor such as hydroquinone, hydroquinone monomethyl ether, 2-tert-butyl hydroquinone, 4-methoxy phenol and 2,6-di-tert-butyl-4-methylphenol (BHT). These may be used singly or two or more of them may be used in combination. The amount is preferably 5 to 500 ppm, further preferably 10 to 100 ppm, based on an amount of compound to be obtained, but is not limited to these.

The present silicone represented by the formula (1) is copolymerized with a monomer to prepare a polymer. Examples of the monomer include acrylic monomers such as (meth)acrylic acid, methyl(meth)acrylate, ethyl(meth)acrylate, polyalkylene glycol mono(meth)acrylate, polyalkylene glycol monoalkyl ether (meth)acrylate, trifluoroethyl(meth)acrylate, 2-hydroxyethyl(meth)acrylate, and 2,3-dihydroxypropyl(meth)acrylate; acrylic acid derivatives such as N,N-dimethylacrylamide, N,N-diethylacrylamide, N-acryloylmorpholine, and N-methyl(meth)acrylamide; and other unsaturated aliphatic or aromatic compounds such as crotonic acid, cinnamic acid, vinyl benzoic acid; and polymerizable group-containing silicone compounds. The acrylic monomers and the acrylic acid derivatives are preferred. The present silicone is polymerized with one or more of the aforesaid monomers to prepare a polymer.

The silicone of the present invention has high hydrophilicity and is well compatible with monomer having high hydrophilicity. Therefore, when the silicone is mixed with a monomer having high hydrophilicity, the mixture is colorless and transparent and shows no turbidity to give a polymer with high hydrophilicity. In the copolymerization, an amount of the present silicone is 1 to 70 parts by mass, preferably 10 to 60 parts by mass, relative to total 100 parts by mass of the present silicone and the polymerizable monomer. The present silicone may polymerize singly with itself to give a polymer.

The copolymerization of the present compound and other polymerizable monomer mentioned just above may be carried out in conventional known manners. For instance, known polymerization initiator such as thermal polymerization initiators or photo polymerization initiators may be used. Examples of the polymerization initiator include 2-hydroxy-2-methyl-1-phenyl-propane-1-one, azobis isobutyronitrile, azobis dimethylvaleronitrile, benzoyl peroxide, tert-butyl hydroperoxide, and cumene hydroperoxide. The polymerization initiator may be used singly or two or more of them may be used in combination. The amount of the polymerization initiator is 0.001 to 2 parts by mass, preferably 0.01 to 1 part by mass, relative to 100 parts by mass of a total amount of the polymerizable components.

The polymer containing the repeating unit derived from silicone of the present invention is colorless and transparent and has high hydrophilicity and oxygen permeability. Therefore, the present silicone is suitable as materials for preparing ophthalmic devices such as contact lenses, e.g. hydrophilic contact lenses and silicone hydrogels, intraocular lenses and artificial corneas. A method for preparation of the ophthalmic device with the present polymer may be any conventional ones. For instance, a machining method and a molding method may be used for forming lenses such as contact lenses and intraocular lenses.

EXAMPLES

The present invention will be explained below in further detail with reference to a series of the Examples and the Comparative Examples, though the present invention is in no way limited by these Examples.
In the following descriptions, $^1$H-NMR analysis was conducted with JNM-ECP500, ex JEOL Ltd. with deuterated acetone as a measuring solvent.

Example 1

In a 1-liter flask equipped with a stirring device, a dimroth condenser, a thermometer and a dropping funnel, put were 20.7 g (0.128 mol) of the compound represented by the following formula (8) and 250.0 g of isopropyl alcohol, and heated to 70 degrees C. 0.42 Gram of a solution in toluene of a reactant (or complex), of alkali-neutralized chloroplatinic acid with vinyl siloxane, containing 0.5% of platinum, was added in the flask. The amount of platinum was 6 ppm based on the total mass of the reaction substrates and the solvent. Then, 100.0 g (0.0142 mol) of the compound represented by the following formula (12) was added dropwise into the flask through the dropping funnel over two hours. Thus, a ratio of the number of the unsaturation in the compound represented by formula (8) to the number of the SiH group in the compound represented by the following formula (12) was 1.5. The reaction mixture was held at 70 degrees C. for 7 hours and, then, the amount of the remaining SiH group in the reaction mixture was determined by the method described below. The amount of the remaining SiH group was 2% or less relative to the amount of the SiH group before the reaction, which means that the reaction was complete. The isopropyl alcohol was stripped off at a reduced pressure to obtain 111.0 g of an oily crude product.

The amount of the remaining SiH group was determined in the following manner.

Precisely 10 grams of a sample is placed in a 100-milliliter Meyer flask and dissolved in 10 ml of n-butanol, to which 20 ml of a 20% aqueous solution of sodium hydroxide is gradually added, so that hydrogen gas generates. The amount of the hydrogen gas generated is determined with a gas burette and reduced to an amount at 0 degree C. and 1 atom according to the following formula:

Amount of the hydrogen gas generated, ml/g,=0.359×P× V/T×S, wherein P is a pressure in the determination, mmHg, V is an amount of the hydrogen gas generated, ml; T is 273+t, wherein t is a temperature, ° C., of the hydrogen gas generated, equal to a temperature in the determination; and S is an amount of the sample.

To the oily crude product thus obtained, 170 g of acetone and 40 g of water were added, and stirred, allowed to stand, followed by separation to obtain a lower silicone layer phase. This washing procedure was repeated further twice to extract the compound represented by the formula (8) into a water/acetone phase. 40 Grams of 1-propanol, 0.01 g (100 ppm) of 4-methoxyphenol and 0.01 g (100 ppm) of 2,6-di-t-butyl-4-methylphenol were added to 134 g of the cloudy lower layer from the extraction, followed by filtration through a filter plate. The resulting filtrate was subjected to a stripping at a reduced pressure to obtain 87.5 g of a colorless, transparent and oily product which was a highly viscous. A yield was 77.7%. $^1$H-NMR analysis showed that the product was a silicone represented by the following formula (13), hereinafter referred to as silicone 1.

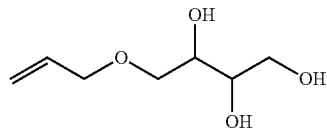

(8)

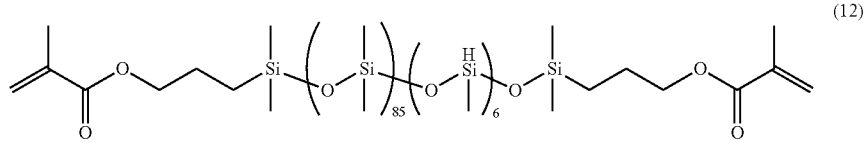

(12)

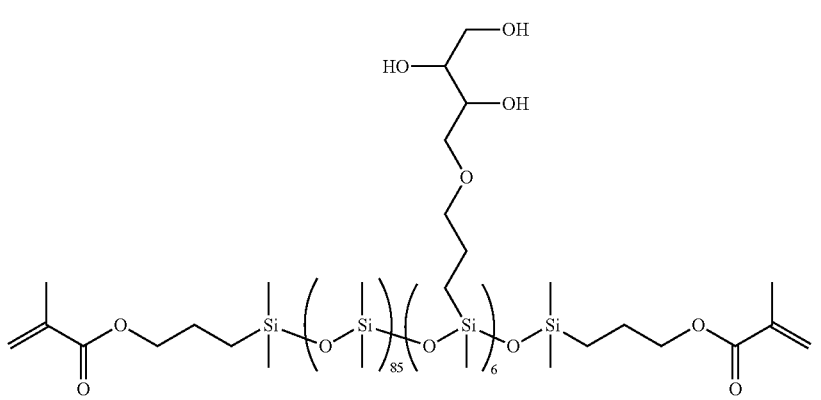

(13)

¹H-NMR spectra data of silicone 1 were as shown below. 0.1 ppm (540H), 0.5 to 0.7 ppm (16H), 1.6 to 1.8 ppm (16H), 1.9 ppm (6H), 3.4 to 3.8 ppm (48H), 4.1 ppm (4H), 5.5 ppm (2H), 6.1 ppm (2H)

The obtained silicone 1 was mixed with each an equal amount of methyl methacrylate and N,N-dimethylacrylamide. They dissolved transparently.

¹H-NMR spectra data of silicone 2 were as shown below. 0.1 ppm (540H), 0.5 to 0.7 ppm (16H), 1.6 to 1.8 ppm (16H), 1.9 ppm (6H), 3.4 to 3.8 ppm (54H), 4.1 ppm (4H), 5.5 ppm (2H), 6.1 ppm (2H)

The obtained silicone 2 was mixed with each an equal amount of methyl methacrylate and N,N-dimethylacrylamide. They dissolved transparently.

Example 2

The procedures of Example 1 were repeated, except that 24.6 g (0.128 mol) of the compound represented by the following formula (9) was used in place of the compound represented by the formula (8), so that a ratio of the number of the unsaturation in the compound represented by formula (9) to the number of the SiH group in the compound represented by the formula (12) was 1.5. 90.2 Grams of a colorless and transparent silicone was obtained, which was a highly viscous. A yield was 77.6%. ¹H-NMR analysis showed that the product was a silicone represented by the following formula (14), hereinafter referred to as silicone 2.

Comparative Example 1

The procedures of Example 1 were repeated, except that 16.9 g (0.128 mol) of the compound represented by the following formula (15) was used in place of the compound represented by the formula (8), so that a ratio of the number of the unsaturation in the compound represented by formula (15) to the number of the SiH group in the compound represented by the formula (12) was 1.5. 81.9 Grams of an oily product was obtained, which was pale brown and transparent. A yield was 73.7%. ¹H-NMR analysis showed that the product was a silicone represented by the following formula (16), hereinafter referred to as silicone 3.

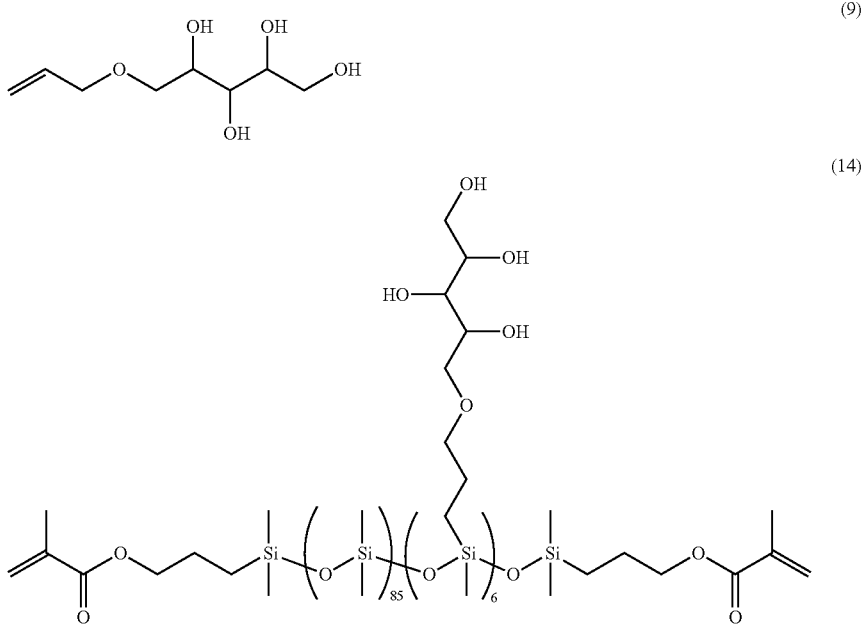

(9)

(14)

The compound obtained in Comparative Example 1 was subjected to purification treatment with filtration through a filter plate in the same manner as in Example, but did not become colorless nor transparent.

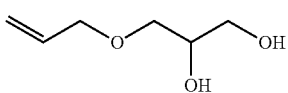

The obtained silicone was mixed with each an equal amount of methyl methacrylate and N,N-dimethylacrylamide. Turbid occurred slightly.

(15)

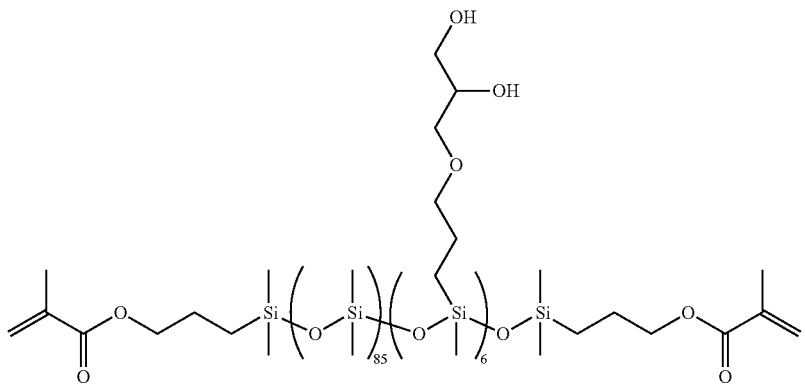

(16)

$^1$H-NMR spectra data of silicone 3 were as shown below. 0.1 ppm (540H), 0.5 to 0.7 ppm (16H), 1.6 to 1.8 ppm (16H), 1.9 ppm (6H), 3.4 to 3.5 ppm (24H), 3.6 ppm (12H), 3.8 ppm (6H), 4.1 ppm (4H), 5.5 ppm (2H), 6.1 ppm (2H)

The obtained silicone 3 was mixed with each an equal amount of methyl methacrylate and N,N-dimethylacrylamide. Turbid occurred slightly.

Comparative Example 2

The procedures of Example 1 described in Japanese Patent Application Laid-Open No. 2016-204534, Patent Literature 2, were repeated to synthesize a colorless and transparent silicone represented by the following formula (17).

Comparative Example 3

The procedures of Example 2 described in Japanese Patent Application Laid-Open No. 2016-204534, Patent Literature 2, were repeated to synthesize a colorless and transparent silicone represented by the following formula (18).

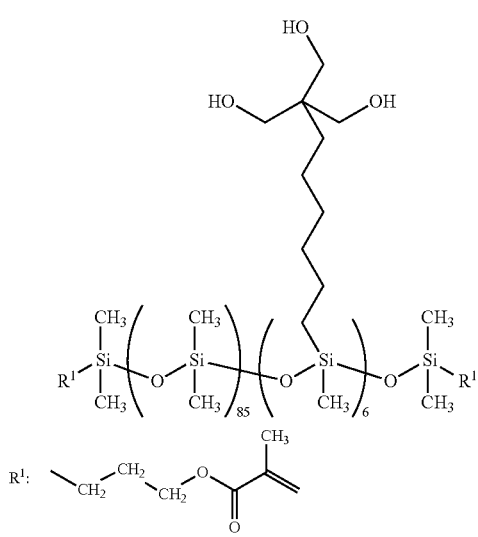

(17)

(18)

The obtained silicone was mixed with each an equal amount of methyl methacrylate and N,N-dimethylacrylamide. Turbid occurred slightly.

As shown in Comparative Example 1, the silicone which had two hydroxyl groups in the hydrophilic side chain was colored, and showed inferior compatibility with other hydrophilic monomers. Therefore, it cannot provide a colorless and transparent copolymer.

As shown in Comparative Examples 2 and 3, the silicone had no ether bond in the hydrophilic side chain showed inferior compatibility with hydrophilic monomers. Therefore, it cannot provide a colorless and transparent copolymer.

In contrast, as shown in Examples 1 to 3, the silicone of the present invention is colorless and transparent, and shows excellent compatible with other hydrophilic monomers, so that a colorless and transparent copolymer is obtained. Accordingly, the silicone of the present invention is suitable as a silicone for preparing ophthalmic devices.

INDUSTRIAL APPLICABILITY

The present silicone provides a colorless and transparent polymer having an excellent hydrophilicity and oxygen permeability. Accordingly, the present silicone and the present method for the preparation thereof are useful for preparing ophthalmic devices such as contact lenses, e.g. hydrophilic contact lenses and silicone hydrogels, intraocular lenses and artificial corneas.

Is should be noted that the present invention is not limited to the above-described embodiments. The above-mentioned embodiments are illustrative, and any embodiment being substantially the same as the technical idea described in the claims of the present invention and exhibiting the same operation and effect is included in the technical scope of the present invention.

The invention claimed is:

1. A silicone represented by the following formula (1):

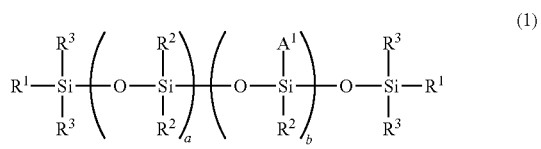

(1)

wherein $R^1$ is a group represented by the following formula (2):

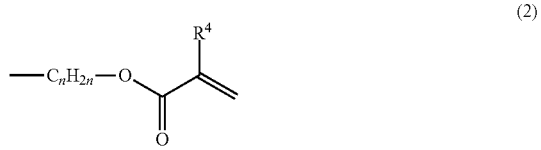

(2)

wherein n is an integer of from 2 to 8, and $R^4$ is a methyl group or a hydrogen atom, $R^2$ is, independently of each other, a substituted or unsubstituted monovalent hydrocarbon group having 1 to 10 carbon atoms, $R^3$ is, independently of each other, an alkyl group having 1 to 6 carbon atoms, $A^1$ is a group represented by the following formula (3):

—$C_mH_{2m}$—O—X (3)

wherein m is an integer of from 2 to 10, X is an unbranched or branched alkyl group having three or four hydroxyl groups, and represented by —$C_pH_{2p+1-q}(OH)_q$, wherein p is an integer of from 1 to 6 and q is 3 or 4, a is an integer of from 1 to 500, b is an integer of from 1 to 100 and a total of a and b is 50 to 600, and the siloxane units in the parentheses may be sequenced at random or form a block unit.

2. The silicone according to claim 1, wherein X is a group represented by the following formula (6) or (7)

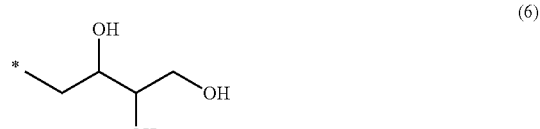

(6)

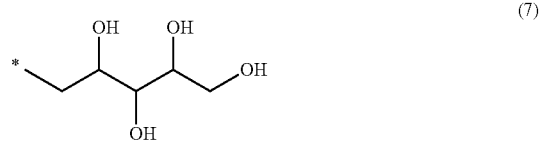

(7)

wherein the site indicated by "*" is a position of bonding to the oxygen atom.

3. A polymer comprising repeating units derived from the silicone according to claim 2.

4. The polymer according to claim 3, comprising repeating units derived from the silicone and another compound polymerizable with said silicone.

5. A polymer comprising repeating units derived from the silicone according to claim 1.

6. The polymer according to claim 5, comprising repeating units derived from the silicone and another compound polymerizable with said silicone.

7. A method for preparing a silicone represented by the following formula (1):

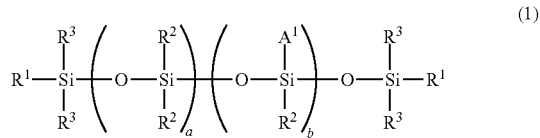

(1)

wherein $R^1$ is a group represented by the following formula (2),

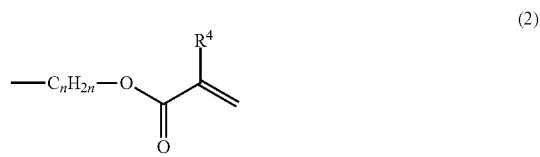

(2)

wherein n is an integer of from 2 to 8, and $R^4$ is a methyl group or a hydrogen atom, $R^2$ is, independently of each other, a substituted or unsubstituted monovalent hydrocarbon group having 1 to 10 carbon atoms, $R^3$ is, independently of each other, an alkyl group having 1 to 6 carbon atoms, $A^1$ is a group represented by the following formula (3):

—$C_mH_{2m}$—O—X (3)

wherein m is an integer of from 2 to 10 , X is an unbranched or branched alkyl group having three or four hydroxyl groups, and represented by —$C_pH_{2p+1-q}(OH)_q$, p is an integer of from 1 to 6 and q is 3 or 4, a is an integer of from 1 to 500 , b is an integer of from 1 to 100 and a total of a and b is 50 to 600, and the siloxane units in the parentheses may be sequenced at random or form a block unit,
comprising a step of addition reacting
an organohydrogenpolysiloxane represented by the following formula (4):

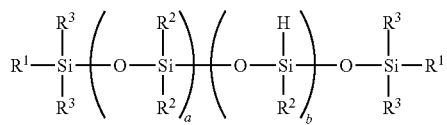 (4)

wherein $R^1$, $R^2$, $R^3$, a and b are as defined above,
with a compound represented by the following formula (5):

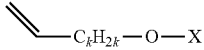 (5)

wherein k=m−2, m and X are as defined above,
to thereby obtain the silicone represented by the formula (1).

8. The method according to claim 7, wherein X is a group represented by the following formula (6) or (7)

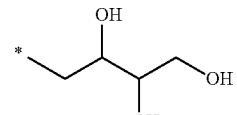 (6)

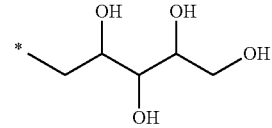 (7)

wherein the site indicated by "*" is a position of bonding to the oxygen atom.

9. The method according to claim 7, comprising a step of purification with an adsorbent and/or a filter after the step of the addition reaction.

* * * * *